United States Patent
Kaneda et al.

(10) Patent No.: US 10,475,581 B2
(45) Date of Patent: Nov. 12, 2019

(54) MULTILAYER CERAMIC CAPACITOR AND MANUFACTURING METHOD OF MULTILAYER CERAMIC CAPACITOR

(71) Applicant: TAIYO YUDEN CO., LTD., Chuo-ku, Tokyo (JP)

(72) Inventors: Kazumi Kaneda, Takasaki (JP); Yasuyuki Inomata, Takasaki (JP); Mikio Tahara, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 0 days.

(21) Appl. No.: 15/836,718

(22) Filed: Dec. 8, 2017

(65) Prior Publication Data

US 2018/0162780 A1 Jun. 14, 2018

(30) Foreign Application Priority Data

Dec. 13, 2016 (JP) ................. 2016-240850

(51) Int. Cl.
*H01G 4/30* (2006.01)
*H01G 4/232* (2006.01)
(Continued)

(52) U.S. Cl.
CPC ............. *H01G 4/30* (2013.01); *B32B 15/00* (2013.01); *C22C 32/0026* (2013.01);
(Continued)

(58) Field of Classification Search
CPC .............................. H01G 4/228; H01G 4/232
See application file for complete search history.

(56) References Cited

U.S. PATENT DOCUMENTS 5,877,934 A * 3/1999 Sano .................. C04B 35/4682
361/312
2014/0026254 A1* 1/2014 Kim .................. C12N 15/8273
800/278
(Continued)

FOREIGN PATENT DOCUMENTS

JP H04260314 A 9/1992
JP 05055076 A * 3/1993
(Continued)

OTHER PUBLICATIONS

C. Barry Carter et al., Responding to Temperature Changes, Ceramic Materials, 2013, Science and Engineering, Springer, Chapter 34, pp. 628-633.

*Primary Examiner* — Eric W Thomas
(74) *Attorney, Agent, or Firm* — Law Office of Katsuhiro Arai

(57) ABSTRACT

A multilayer ceramic capacitor includes: a multilayer chip in which each of dielectric layers and each of internal electrode layers are alternately stacked and are alternately exposed to two edge faces thereof; and external electrodes formed on the two edge faces; wherein: the external electrodes have a structure in which a plated layer is formed on a ground layer whose main component is a metal or an alloy, a thermal expansion coefficient of the metal being larger than that of a main ceramic component of the dielectric layer, the ground layer including a ceramic additive; outermost layers of the multilayer chip are cover layers whose main component is a main component of the dielectric layer; and thermal expansion coefficients satisfy a relationship of, the main component of the ground layer>the main component of the cover layers>the ceramic additive.

5 Claims, 4 Drawing Sheets

(51) Int. Cl.
*H01G 4/12* (2006.01)
*H01G 4/005* (2006.01)
*B32B 15/00* (2006.01)
*C22C 32/00* (2006.01)
*B22F 7/04* (2006.01)

(52) U.S. Cl.
CPC ............... *H01G 4/005* (2013.01); *H01G 4/12* (2013.01); *H01G 4/1263* (2013.01); *H01G 4/232* (2013.01); *B22F 2007/047* (2013.01)

(56) References Cited

U.S. PATENT DOCUMENTS

2014/0226254 A1* 8/2014 Kim .................. H01G 4/30
                                                    361/301.4
2015/0122536 A1* 5/2015 Na .................. H01G 4/0085
                                                    174/260

FOREIGN PATENT DOCUMENTS

JP          11260147 A  *  9/1999
JP          2005044903 A     2/2005

\* cited by examiner

FIG. 4

| | CERAMIC ADDITIVE | WEIGHT PART | VOLUME FRACTION % | CRACK INCIDENCE RATE | | THERMAL EXPANSION COEFFICIENT $\alpha_c$ $\times 10^{-6}/K$ |
|---|---|---|---|---|---|---|
| | | | | BAKING CONDITION 1 | BAKING CONDITION 2 | |
| EXAMPLE 1 | $CaZrO_3$ | 30 | 35.7 | 0 | 0 | 13.3 |
| | | 20 | 27.1 | 0 | 0 | 13.8 |
| | | 10 | 15.6 | 3 | 87 | 14.5 |
| EXAMPLE 2 | $BaTiO_3$ : CORDIERITE = 1:1 | 40 | 45.0 | 0 | 0 | 12.6 |
| | | 30 | 38.0 | 0 | 0 | 13.1 |
| | | 20 | 29.0 | 0 | 0 | 13.8 |
| | | 10 | 17.0 | 10 | 90 | 14.6 |
| EXAMPLE 3 | CORDIERITE | 25 | 45.2 | 0 | 0 | 10.8 |
| | | 20 | 39.7 | 0 | 0 | 11.5 |
| | | 10 | 24.8 | 0 | 0 | 13.1 |
| | | 6.5 | 17.6 | 0 | 0 | 13.9 |
| | | 5 | 14.2 | 0 | 30 | 14.2 |
| COMPARATIVE EXAMPLE 1 | $BaTiO_3$ | 50 | 42.5 | 55 | 100 | 14.6 |
| | | 40 | 37.2 | 95 | 100 | 14.7 |
| | | 20 | 22.8 | 100 | 100 | 15.1 |

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2016-240850, filed on Dec. 13, 2016, the entire contents of which are incorporated herein by reference.

FIELD

A certain aspect of the present invention relates to a multilayer ceramic capacitor and a manufacturing method of a multilayer ceramic capacitor.

BACKGROUND

A multilayer ceramic capacitor has a multilayer structure in which a plurality of dielectric layers and a plurality of internal electrode layers are alternately stacked, and a pair of external electrodes that are formed on edge faces of the multilayer structure and are electrically coupled to the internal electrode layers extracted to the edge faces. There is a method of coating an external electrode paste on an unsintered ceramic multilayer structure and sintering a ground layer of the external electrode together with the ceramic multilayer structure, as a method of forming the external electrode (for example, see Japanese Patent Application Publications No. H04-260314 and No. 2005-44903.

SUMMARY OF THE INVENTION

In the method, a crack may occur in a dielectric layer near a sintered external electrode because of sintering shrinkage difference between the external electrode paste and the ceramic multilayer structure. And so, a large amount of a ceramic additive is added to the external electrode paste in order to improve adhesion to the dielectric layer and reduce the sintering shrinkage difference between the external electrode and the dielectric layer. Thereby, the occurrence of the crack may be suppressed. However, when the large amount of the ceramic additive is added to the external electrode paste, it may be difficult to forming a plated layer on the ground layer.

The present invention has a purpose of providing a multilayer ceramic capacitor and a manufacturing method of the multilayer ceramic capacitor that are capable of suppressing influence on a plating process and suppressing occurrence of a crack.

According to an aspect of the present invention, there is provided a multilayer ceramic capacitor including: a multilayer chip having a parallelepiped shape in which each of a plurality of dielectric layers and each of a plurality of internal electrode layers are alternately stacked and are alternately exposed to two edge faces of the multilayer chip, a main component of the plurality of dielectric layers being a ceramic; and a pair of external electrodes that are formed on the two edge faces; wherein: the pair of external electrodes have a structure in which a plated layer is formed on a ground layer of which a main component is a metal or an alloy of the metal, a thermal expansion coefficient of the metal being larger than that of a main ceramic component of the dielectric layer, the ground layer including a ceramic additive; outermost layers of the multilayer chip in a stack direction of the multilayer chip are cover layers of which a main component is a main component of the dielectric layer; and thermal expansion coefficients of the main component of the ground layer, the ceramic additive and the main component of the cover layers satisfy a relationship of, the main component of the ground layer>the main component of the cover layers>the ceramic additive.

According to another aspect of the present invention, there is provided a manufacturing method of a multilayer ceramic capacitor including: forming a ceramic multilayer structure having a parallelepiped shape in which each of a plurality of ceramic dielectric green sheets and each of a plurality of conductive pastes for forming an internal electrode are alternately stacked and are alternately exposed to two edge faces of the ceramic multilayer structure, outermost layers of the ceramic multilayer structure being cover sheets of which a main component is a main component of the ceramic dielectric green sheet; coating a metal paste from the two edge faces to a side face of the ceramic multilayer structure, the metal paste including a metal powder and a ceramic additive, a main component of the metal powder being a metal or an alloy of the metal, a thermal expansion coefficient of the metal being larger that of a main ceramic component of the ceramic dielectric green sheet; and sintering the ceramic multilayer structure after the coating, wherein thermal expansion coefficients of the main component of the metal powder, the ceramic additive and the main ceramic component of the cover layers satisfy a relationship of, the main component of the metal powder>the main ceramic component>the ceramic additive.

BRIEF DESCRIPTION OF THE DRAWINGS

FIG. 4 illustrates examples and comparative examples.

DETAILED DESCRIPTION

A description will be given of an embodiment with reference to the accompanying drawings.

Embodiment

Figure 1:
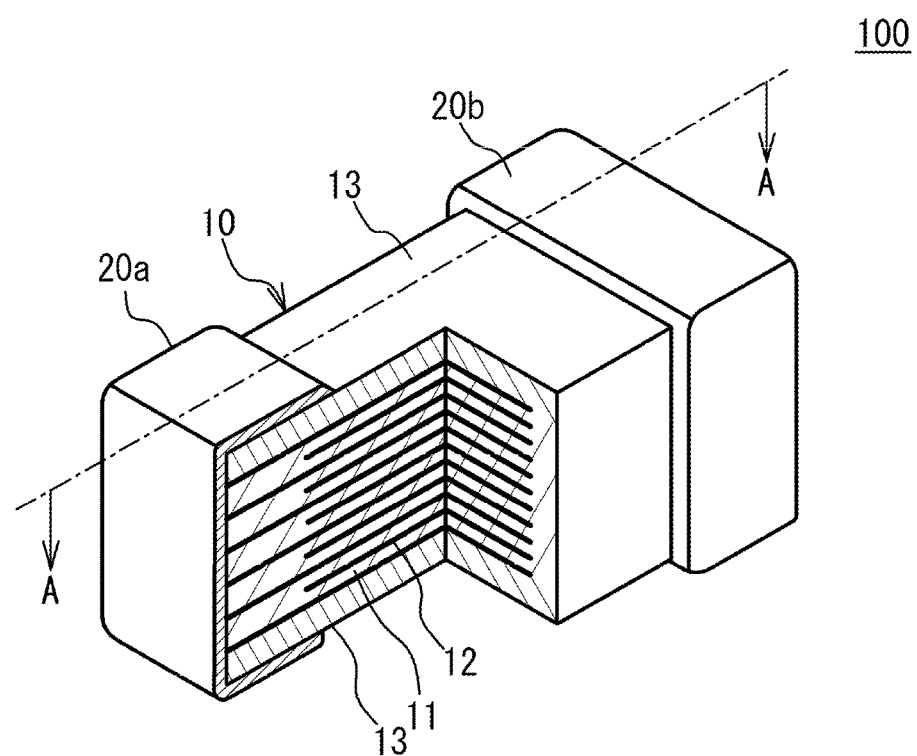
FIG. 1 illustrates a partial perspective view of a multilayer ceramic capacitor.

A description will be given of a multilayer ceramic capacitor. FIG. 1 illustrates a partial perspective view of a multilayer ceramic capacitor 100. As illustrated in FIG. 1, the multilayer ceramic capacitor 100 includes a multilayer chip 10 having a rectangular parallelepiped shape, and a pair of external electrodes 20a and 20b that are respectively provided at two edge faces of the multilayer chip 10 facing each other. Four faces of the multilayer chip 10 other than the two edge faces are referred to as side faces. The external electrodes 20a and 20b extend to the four side faces. However, the external electrodes 20a and 20b are spaced from each other on the four side faces.

The multilayer chip 10 has a structure designed to have dielectric layers 11 and internal electrode layers 12 alternately stacked. The dielectric layer 11 includes ceramic material acting as a dielectric material. End edges of the internal electrode layers 12 are alternately exposed to a first edge face of the multilayer chip 10 and a second edge face of the multilayer chip 10 that is different from the first edge face. In the embodiment, the first face faces with the second face. The external electrode 20a is provided on the first edge face. The external electrode 20b is provided on the second edge face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, both edge faces in the stack direction of the dielectric layers 11 and the internal electrode layers 12 (hereinafter referred to as stack direction) are covered by cover layers 13. A main component of the cover layer 13 is the same as a main component of the dielectric layer 11. Therefore, it is possible to say the cover layer is an outermost dielectric layer in the stack direction of the multilayer chip 10.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of noble metal such as platinum (Pt), palladium (Pd), silver (Ag), gold (Au) or alloy thereof. The dielectric layers 11 are mainly composed of a ceramic material having a perovskite structure expressed by a general formula $ABO_3$. The perovskite structure includes $ABO_{3-\alpha}$ having an off-stoichiometric composition. For example, the ceramic material is $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ (0≤x≤1, 0≤y≤1, 0≤z≤1) having a perovskite structure.

Figure 2:
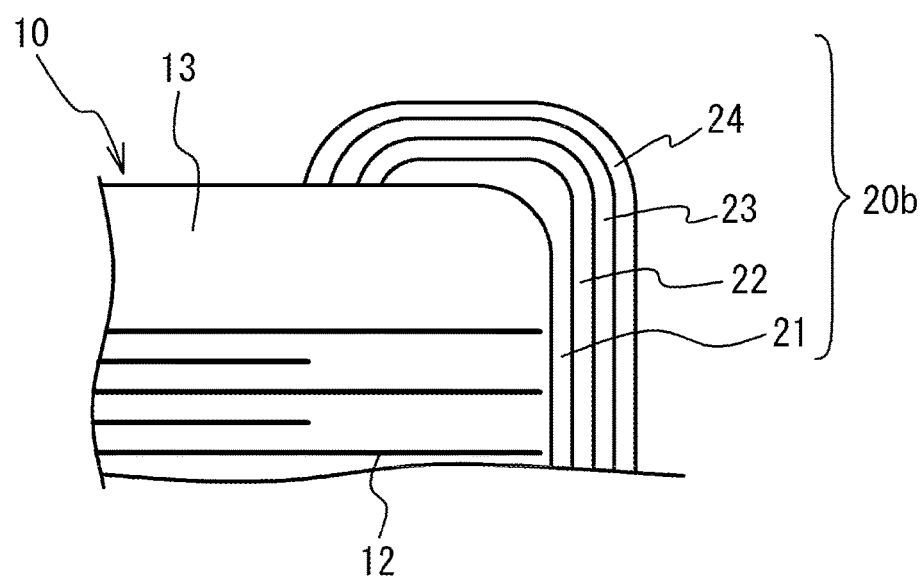
FIG. 2 illustrates a cross sectional view taken along a line A-A of FIG. 1.

FIG. 2 illustrates a cross sectional view of the external electrode 20b and is a cross sectional view taken along a line A-A of FIG. 1. In FIG. 2, hatching for cross section is omitted. As illustrated in 2, the external electrode 20b has a structure in which a Cu-plated layer 22, a Ni-plated layer 23 and a Sn-plated layer 24 are formed on a ground layer 21 in this order. The ground layer 21, the Cu-plated layer 22, the Ni-plated layer 23 and the Sn-plated layer 24 extend toward the four side faces of the multilayer chip 10 from the both edge faces of the multilayer chip 10. In FIG. 2, the external electrode 20b is illustrated. However, the external electrode 20a has the same structure as the external electrode 20b.

A main component of the ground layer 21 is a metal of which a thermal expansion coefficient is larger than that of a main ceramic component of the dielectric layer 11 or an alloy including the metal. The ground layer 21 includes a ceramic additive for controlling sinterability of the ground layer 21. The ground layer 21 may include a glass component for compacting the ground layer 21. For example, a main component of the ground layer 21 is such as Ni, Cu or Pd. The glass component is an oxide such as Ba, Sr, Ca, Zn (zinc), Al (aluminum), Si (silicon), B (boron) or the like.

The ceramic additive of the ground layer 21 has a small thermal expansion coefficient. In concrete, the following formula (1) is satisfied with respect to the thermal expansion coefficient.

the main component of the ground layer 21>the
main ceramic component of the cover layer
13>the ceramic additive of the ground layer 21     (1)

When the formula (1) is satisfied, the thermal expansion coefficient of the ground layer 21 gets closer to those of the cover layer 13 and the dielectric layer 11. That is, it is possible to reduce a difference between the thermal expansion coefficient of the ground layer 21 and thermal expansion coefficients of the cover layer 13 and the dielectric layer 11. Thus, a stress between the ground layer 21, and the cover layer 13 and the dielectric layer 11 is suppressed. It is therefore possible to suppress occurrence of a crack in the cover layer 13 and the dielectric layer 11 (specifically a part of the ground layer 21 and a part of the cover layer 13 near the ground layer 21). The excessive addition of the ceramic additive causes defects of the plating surface on the ground layer 21. It is not necessary to excessively add the ceramic additive. It is therefore possible to suppress influence on the plating process performed on the ground layer 21.

It is preferable that the difference between the thermal expansion coefficient of the ground layer 21 and the thermal expansion coefficients of the cover layer 13 and the dielectric layer 11 is smaller. And so, it is preferable that the ceramic additive is added to the ground layer 21 in accordance with a rule of mixtures of the thermal expansion coefficient as expressed by the following formula (2). For example, it is preferable that ac calculated by the formula (2) is within ±20% of the thermal expansion coefficient of the cover layer 13. It is more preferable that ac is within ±10% of the thermal expansion coefficient of the cover layer 13. A volume fraction is a rate of the volume with respect to the whole volume of the ground layer 21.

$$\alpha_c = (\alpha_a E_a V_a + \alpha_m E_m V_m)/(E_a V_a + E_m V_m) \quad (2)$$

$\alpha_c$: a thermal expansion coefficient of the ground layer 21
$\alpha_a$: a thermal expansion coefficient of a ceramic additive
$E_a$: Young's modulus
$V_a$: a volume fraction of a ceramic additive of the ground layer 21
$\alpha_m$: a thermal expansion coefficient of a main component of the ground layer 21
$E_m$: Young's modulus of a main component of the ground layer 21
$V_m$: a volume fraction of a main component of the ground layer 21

The ceramic additive added to the ground layer 21 is not limited when the ceramic additive is ceramic satisfying the formula (1). The ceramic additive added to the ground layer 21 is such as $CaZrO_3$ (calcium zirconate), $3Al_2O_3 \cdot 2SiO_2$ (mullite), $2MgO \cdot 2Al_2O_3 \cdot 5SiO_2$ (cordierite), SiC (silicon carbide), $Si_3N_4$ (silicon nitride), BN (boron nitride), AlN (aluminum nitride), silica glass or the like. A main component material of the cover layer 13 and a main component material of the dielectric layer 11 are oxides. It is therefore preferable that the ceramic additive added to the ground layer 21 is an oxide. A combination of two or more ceramics are added as the ceramic additive added to the ground layer 21.

Figure 3:
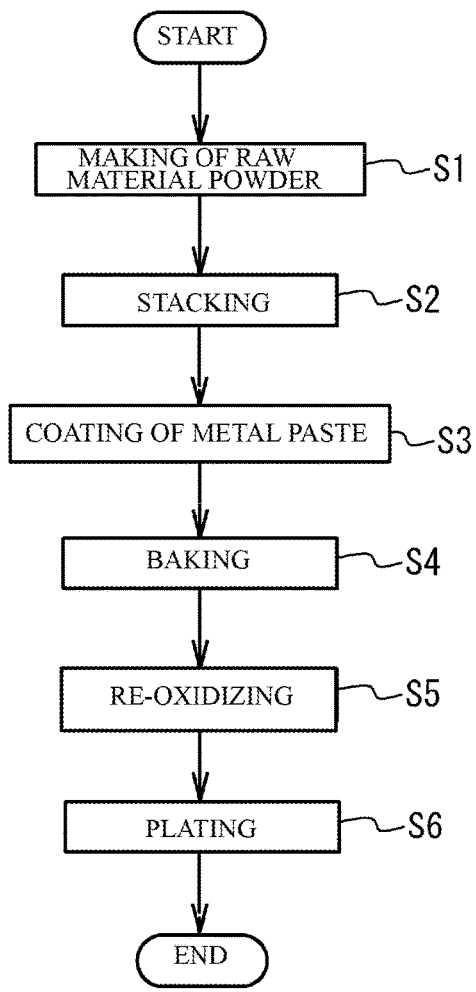
FIG. 3 illustrates a flowchart of a manufacturing method of a multilayer ceramic capacitor.

Next, a description will be given of a manufacturing method of the multilayer ceramic capacitor 100. FIG. 3 illustrates a manufacturing method of the multilayer ceramic capacitor 100.

[Making Process of a Raw Material Powder]

Additive compound may be added to ceramic powder that is a main component of the dielectric layer 11, in accordance with purposes. The additive compound may be an oxide of Mg (magnesium), Mn (manganese), V (vanadium), Cr (chromium) or a rare earth element (Y (yttrium), Dy (dysprosium), Tm (thulium), Ho (holmium), Tb (terbium), Yb (ytterbium), Sm (samarium), Eu (europium), Gd (gadolinium) and Er (erbium)), or an oxide of Co (cobalt), Ni, Li (lithium), B, Na (sodium), K (potassium) and Si, or glass. For example, compound including additive compound is added to ceramic material powder and is calcined. Next, the resulting ceramic material grains are wet-blended with additive compound, is dried and is crushed. Thus, the ceramic material powder is prepared.

[Stacking Process]

Next, a binder such as polyvinyl butyral (PVB) resin, an organic solvent such as ethanol or toluene, and a plasticizer are added to the resulting ceramic powder and wet-blended. With use of the resulting slurry, a strip-shaped dielectric green sheet with a thickness of 0.8 μm or less is coated on a base material by, for example, a die coater method or a doctor blade method, and then dried.

Then, a pattern of the internal electrode layer 12 is provided on the surface of the dielectric green sheet by printing a conductive paste for forming the internal electrode with use of screen printing or gravure printing. The conductive paste includes powder of the main component metal of the internal electrode layer 12, a binder, a solvent, and additives as needed. It is preferable that the binder and the solvent are different from those of the above-mentioned ceramic slurry. As a ceramic additive, the ceramic material that is the main component of the dielectric layer 11 may be distributed in the conductive paste.

Then, the dielectric green sheet on which the internal electrode layer pattern is printed is stamped into a predetermined size, and a predetermined number (for example, 200 to 500) of stamped dielectric green sheets are stacked while the base material is peeled so that the internal electrode layers 12 and the dielectric layers 11 are alternated with each other and the end edges of the internal electrode layers 12 are alternately exposed to both edge faces in the length direction of the dielectric layer so as to be alternately led out to a pair of external electrodes of different polarizations. Cover sheets, which are to be the cover layers 13, are compressed on the stacked green sheets and under the stacked sheets. The resulting compact is cut into a predetermined size (for example, 1.0 mm×0.5 mm). A main component of the cover sheet is the same as the main component of the dielectric green sheet. Thus, a ceramic multilayer structure having a rectangular parallelepiped shape is obtained.

[Coating Process of a Metal Paste]

Next, the binder is removed from the ceramic multilayer structure made in the stacking process in $N_2$ atmosphere in a temperature range of 250 degrees C. to 500 degrees C. After that, a metal paste including a metal filler, the ceramic additive, the binder and the solvent is coated from the both edge faces of the ceramic multilayer structure to each side face and is dried. The metal paste is used for forming the external electrodes. The ceramic additive satisfying the formula (1) is used.

[Sintering Process]

Next, the resulting ceramic multilayer structure on which the metal paste for forming the external electrode is sintered for ten minutes to 2 hours in a reductive atmosphere in a temperature range of 1100 degrees C. to 1300 degrees C. In this manner, a sintered structure having the multilayer chip 10 having the multilayer structure in which the sintered dielectric layers 11 and the sintered internal electrode layers 12 are alternately stacked, having the cover layers 13 formed as outermost layers of the multilayer chip 10 in the stack direction and having the ground layer 21 is obtained.

[Re-Oxidizing Process]

The resulting sintered structure may be subjected to a re-oxidizing process in $N_2$ atmosphere in a temperature range of 600 degrees C. to 1000 degrees C.

[Plating Process]

After that, a plating process is performed. Thereby, the Cu-plated layer 22, the Ni-plated layer 23 and the Sn-plated layer 24 are formed on the ground layer 21 in this order. With the processes, the multilayer ceramic capacitor 100 is fabricated.

In the manufacturing method in accordance with the embodiment, the ceramic additive is added to the ground layer 21 so as to satisfy the formula (1). When the formula (1) is satisfied, the thermal expansion coefficient of the ground layer 21 gets closer to the thermal expansion coefficients of the cover layer 13 and the dielectric layer 11. Thus, the stress between the ground layer 21, and the cover layer 13 and the dielectric layer 11 is suppressed. It is therefore possible to suppress the occurrence of a crack in the cover layer 13 and the dielectric layer 11 (specifically parts of the cover layer 13 and the dielectric layer 11 near the ground layer 21). It is not necessary to excessively add the ceramic additive. It is therefore possible to suppress the influence on the plating process performed on the ground layer 21.

EXAMPLES

Before manufacturing a multilayer ceramic capacitor, a paste was prepared by adding a ceramic additive to Ni of a metal paste for forming an external electrode. Cordierite, $CaZrO_3$ and $BaTiO_3$ were used as the ceramic additive. FIG. 4 illustrates a weight part of the ceramic additive. The paste was dried at 100 degrees C., and was crushed. After that, circular cylinders having a diameter φ of 6 mm and a height of 5 mm were formed from the crushed paste. A binder was removed from the circular cylinders. And pellets were made by a sintering in a reducing atmosphere. With use of the pellets, thermal expansion coefficients were measured in nitrogen atmosphere with a TMA (Thermomechanical Analysis device), and thermal expansion coefficients in a temperature range of 200 degrees C. to 400 degrees C. were calculated. And the thermal expansion coefficients were compared with each other. As illustrated in FIG. 4, it was confirmed that when a thermal expansion coefficient of the ceramic powder used for the ceramic additive was small, a thermal expansion coefficient of the pellet was also small.

The multilayer ceramic capacitors in accordance with the embodiment were made and the property was measured.

Examples 1 to 3

Additive compound was added to barium titanate powder. The resulting barium titanate powder was sufficiently wet blended and was crushed in a ball mill. Thus, a dielectric material was obtained. An organic binder and a solvent were added to the dielectric material. And dielectric green sheets were made by a doctor blade method. The organic binder was polyvinyl butyral (PVB) resin or the like. The solvent was ethanol, toluene or the like. And a plasticizer and so on were added as needed. Thereby, a conductive paste for forming an internal electrode layer was made. The conductive paste was screen-printed on the dielectric sheet. 350 of the dielectric green sheets on which the conductive paste for forming the internal electrode layer was printed and were stacked, and cover sheets were stacked on the stacked dielectric green sheets and under the stacked dielectric green sheets. After that, a ceramic multilayer structure was obtained by a thermal compressing. And the ceramic multilayer structure was cut into a predetermined size.

The binder was removed from the resulting ceramic multilayer structure. After that, a metal paste including metal filler of which a main component is Ni, a ceramic additive, a binder and a solvent was coated from both edge faces of the ceramic multilayer structure to each side face, and was dried. In the example 1, $CaZrO_3$ was used as the ceramic additive. In the example 2, a mixture of $BaTiO_3$ and cordierite (1:1 in volume) was used as the ceramic additive. In the example 3, cordierite was used as the ceramic additive. A weight part of the added ceramic additive was the same as that of the pellet and is shown in FIG. 4. After that, the metal paste was sintered together with the ceramic multilayer structure and a sintered structure was obtained. A temperature of the sintering was 1250 degrees C. to 1300 degrees C. in both a first sintering condition and a second sintering condition. In the first sintering condition, a partial pressure of oxygen was $10^{-9}$ atm. In the second sintering condition, a partial pressure of oxygen was $10^{-10}$ atm.

A length, a width and a height of the sintered structure were respectively 3.2 mm, 1.6 mm and 1.6 mm. A thickness of the dielectric layer 11 was 3.2 µm. A thickness of the cover layer was 300 µm. A thickness of the ground layer 21 was 20 µm. A design capacity was 10 µF. The sintered structure was re-oxidized in $N_2$ atmosphere at 1000 degrees C. After that, the Cu-plated layer 22, the Ni-plated layer 23 and the Sn-plated layer 24 were formed on the surface of the ground layer 21 by plating. And the multilayer ceramic capacitor 100 was fabricated. 100 samples of the examples 1 to 3 were made.

Comparative Example 1

In a comparative example 1, $BaTiO_3$ was used as the ceramic additive added to the metal paste for the ground layer 21. Other conditions were the same as those of the examples 1 to 3. 100 samples of the comparative example 1 were manufactured.

An incident rate of the crack after sintering was measured with respect to the examples 1 to 3 and the comparative example 1. FIG. 4 illustrates a result. As illustrated in FIG. 4, in the comparative example 1, the incident rate of the crack was high. This is because the same material as the cover layer 13 was used as the ceramic additive, the thermal expansion coefficient of the ground layer 21 was not small, and the difference between the thermal expansion coefficients of the ground layer 21 and the cover layer 13 was large. On the other hand, in the examples 1 to 3, the incident rate of the crack was low. This is because a component satisfying the formula (1) was used as the ceramic additive, the thermal expansion coefficient of the ground layer 21 was small, and the difference between the thermal expansion coefficients of the ground layer 21 and the cover layer 13 was small. When cordierite was used as the ceramic additive, the thermal expansion coefficient was small. It is therefore preferable that cordierite is used.

In the examples 1 to 3, the incident rate of the crack under the sintering condition 1 was smaller than that under the sintering condition 2. This is because spheroidizing of the internal electrode layer was suppressed because of high oxygen partial pressure, and the changing of the shrinkage of the multilayer chip 10 was suppressed.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
   a multilayer chip having a parallelepiped shape in which each of a plurality of dielectric layers and each of a plurality of internal electrode layers are alternately stacked and are alternately exposed to two edge faces of the multilayer chip, a main component of the plurality of dielectric layers being a ceramic; and
   a pair of external electrodes that are formed on the two edge faces;
   wherein:
   the pair of external electrodes each have a structure in which a plated layer is formed on a ground layer of which a main component is a metal or an alloy of the metal, a thermal expansion coefficient of the metal being larger than that of a main ceramic component of the dielectric layer, the ground layer including a ceramic additive and directly contacting the two edge faces, the ceramic additive including a ceramic additive component selected from the group consisting of $CaZrO_3$ (calcium zirconate), $3Al_2O_3 \cdot 2SiO_2$ (mullite), $2MgO \cdot 2Al_2O_3 \cdot 5SiO_2$ (cordierite), SiC (silicon carbide), $Si_3N_4$ (silicon nitride), BN (boron nitride), and AlN (aluminum nitride);
   outermost layers of the multilayer chip in a stack direction of the multilayer chip are cover layers of which a main component is a main component of the dielectric layer; and
   thermal expansion coefficients of the main component of the ground layer, the ceramic additive component, and the main component of the cover layers satisfy a relationship of, the main component of the ground layer>the main component of the cover layers>the ceramic additive component,
   wherein the ceramic additive component is added to the ground layer in a manner that a thermal expansion coefficient of the ground layer, $\alpha_c$, is within ±20% of a thermal expansion coefficient of the cover layer, where $\alpha_c = (\alpha_a E_a V_a + \alpha_m E_m V_m)/(E_a V_a + E_m V_m)$:
   $\alpha_a$: the thermal expansion coefficient of the ceramic additive component
   $E_a$: Young's modulus of the ceramic additive component of the ground layer
   $V_a$: a volume fraction of the ceramic additive component of the ground layer
   $\alpha_m$: the thermal expansion coefficient of the main component of the ground layer
   $E_m$: Young's modulus of the main component of the ground layer
   $V_m$: a volume fraction of the main component of the ground layer.

2. The multilayer ceramic capacitor as claimed in claim 1, wherein a main component of the ground layer is Ni.

3. The multilayer ceramic capacitor as claimed in claim 1, wherein the ceramic additive component is an oxide.

4. The multilayer ceramic capacitor as claimed in claim 1, wherein a main component of the dielectric layer is barium titanate.

5. A manufacturing method of a ceramic multilayer capacitor comprising:

forming a ceramic multilayer structure having a parallelepiped shape in which each of a plurality of ceramic dielectric green sheets and each of a plurality of conductive pastes for forming an internal electrode are alternately stacked and are alternately exposed to two edge faces of the ceramic multilayer structure, outermost layers of the ceramic multilayer structure being cover sheets of which a main component is a main component of the ceramic dielectric green sheet;

coating a metal paste from the two edge faces to a side face of the ceramic multilayer structure to form a ground layer, the metal paste including a metal powder and a ceramic additive, a main component of the metal powder being a metal or an alloy of the metal, a thermal expansion coefficient of the metal being larger that of a main ceramic component of the ceramic dielectric green sheet, wherein the metal paste directly contacts the two edge faces, and the ceramic additive includes a ceramic additive component selected from the group consisting of $CaZrO_3$ (calcium zirconate), $3Al_2O_3.2SiO_2$ (mullite), $2MgO.2Al_2O_3.5SiO_2$ (cordierite), SiC (silicon carbide), $Si_3N_4$ (silicon nitride), BN (boron nitride), and AlN (aluminum nitride); and sintering the ceramic multilayer structure after the coating, wherein thermal expansion coefficients of the main component of the metal powder, the ceramic additive component, and the main ceramic component of the cover layers satisfy a relationship of, the main component of the metal powder>the main ceramic component>the ceramic additive component, wherein the ceramic additive component is added to the metal paste in a manner that a thermal expansion coefficient of the ground layer, $\alpha_c$, is within ±20% of a thermal expansion coefficient of the cover layer, where $\alpha_c = (\alpha_a E_a V_a + \alpha_m E_m V_m)/(E_a V_a + E_m V_m)$:

$\alpha_a$: the thermal expansion coefficient of the ceramic additive component $E_a$: Young's modulus of the ceramic additive component of the ground layer $V_a$: a volume fraction of the ceramic additive component of the ground layer $\alpha_m$: the thermal expansion coefficient of the main component of the ground layer $E_m$: Young's modulus of the main component of the ground layer $V_m$: a volume fraction of the main component of the ground layer.

* * * * *

UNITED STATES PATENT AND TRADEMARK OFFICE
CERTIFICATE OF CORRECTION

PATENT NO. : 10,475,581 B2  
APPLICATION NO. : 15/836718  
DATED : November 12, 2019  
INVENTOR(S) : Kazumi Kaneda, Yasuyuki Inomata and Mikio Tahara It is certified that error appears in the above-identified patent and that said Letters Patent is hereby corrected as shown below:

In the Specification

At Column 4, Line 54, in "$3Al_2O_3.2SiO_2$" please delete a "." between "$O_3$" and "$2SiO$" and insert therefor --·--.

At Column 4, Line 55, in "$2MgO.2Al_2O_3.5SiO_2$", please delete a "." between "$2MgO$" and "$2Al$" and between "$O_3$" and "$5SiO$" and insert therefor --·--.

In the Claims

At Column 8, Line 30, in Claim 1, in "$3Al_2O_3.2SiO_2$", please delete a period "." between "$O_3$ and "$2SiO$" and insert therefor --·--.

At Column 8, Line 31, in Claim 1, in "$2MgO.2Al_2O_3.5SiO_2$", please delete a "." between "$2MgO$" and "$2Al$" and between "$O_3$" and "$5SiO$" and insert therefor --·--.

At Column 9, Line 24, in Claim 5, in "$3Al_2O_3.2SiO_2$", please delete a period "." between "$O_3$ and "$2SiO$" and insert therefor --·--.

At Column 9, Line 24, in Claim 5, in "$2MgO.2Al_2O_3.5SiO_2$", please delete a "." between "$2MgO$" and "$2Al$" and between "$O_3$" and "$5SiO$" and insert therefor --·--.

Signed and Sealed this  
Twenty-first Day of January, 2020

Andrei Iancu  
*Director of the United States Patent and Trademark Office*